(12) United States Patent
Giles et al.

(10) Patent No.: US 7,016,098 B2
(45) Date of Patent: Mar. 21, 2006

(54) OPTICAL DEVICE WITH CONFIGURABLE CHANNEL ALLOCATION

(75) Inventors: Randy Clinton Giles, Whippany, NJ (US); Dan Mark Marom, Howell, NJ (US); David Thomas Neilson, Old Bridge, NJ (US); Roland Ryf, Aberdeen, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/666,058

(22) Filed: Sep. 18, 2003

(65) Prior Publication Data

US 2004/0130774 A1 Jul. 8, 2004

Related U.S. Application Data

(63) Continuation-in-part of application No. 09/944,800, filed on Aug. 31, 2001, now Pat. No. 6,657,770.

(51) Int. Cl.
    *G02B 26/00* (2006.01)
(52) U.S. Cl. .................... 359/290; 359/291; 359/298
(58) Field of Classification Search .......... 359/115–19, 359/124, 127–33, 298, 290–1, 558, 652, 359/641–2, 644
    See application file for complete search history.

(56) References Cited

U.S. PATENT DOCUMENTS

| 5,960,133 | A | 9/1999 | Tomlinson ................... 385/18 |
| 6,268,952 | B1 | 7/2001 | Godil et al. ................ 359/291 |
| 6,504,643 | B1 * | 1/2003 | Peeters et al. .............. 359/290 |
| 6,594,082 | B1 * | 7/2003 | Li et al. ..................... 359/618 |
| 6,657,771 | B1 * | 12/2003 | Okayama .................... 359/290 |
| 6,751,000 | B1 * | 6/2004 | Allen et al. ................. 359/237 |
| 2002/0131687 | A1 | 9/2002 | Wilde ......................... 385/24 |
| 2002/0176151 | A1 * | 11/2002 | Moon et al. ................ 359/298 |
| 2002/0196520 | A1 | 12/2002 | Marom et al. ............. 359/290 |
| 2005/0058393 | A1 * | 3/2005 | Solgaard et al. ............. 385/18 |

OTHER PUBLICATIONS

D.T. Neilson et al., "Channelized Dispersion Compensator with Flat pass bands using an array of deformable MEMS mirrors" Optical Fiber Communication Conference, 2003, PD 29 (2003).

* cited by examiner

*Primary Examiner*—Jordan M. Schwartz
*Assistant Examiner*—Jessica Stultz

(57) ABSTRACT

An optical device for discretionary treatment of channels of an optical beam, the optical device comprising: (a) a port for at least transmitting or receiving a first beam having a plurality of channels; (b) a wavelength discriminating device optically coupled to the port, the wavelength discriminating device adapted for at least one of receiving the first beam and diffracting the beam into a plurality of channel beams or receiving a plurality of channel beams and combining the channel beams into the first beam; and (c) an array of reflective elements, the reflective elements exceeding the number of channels, at least a portion of the reflective elements being optically coupled to the wavelength discriminating device to reflect the channel beams, at least two reflective elements of the portion corresponding to a particular channel beam, the at least two reflective elements being controllable to effect a desired output of the particular channel beam.

37 Claims, 8 Drawing Sheets

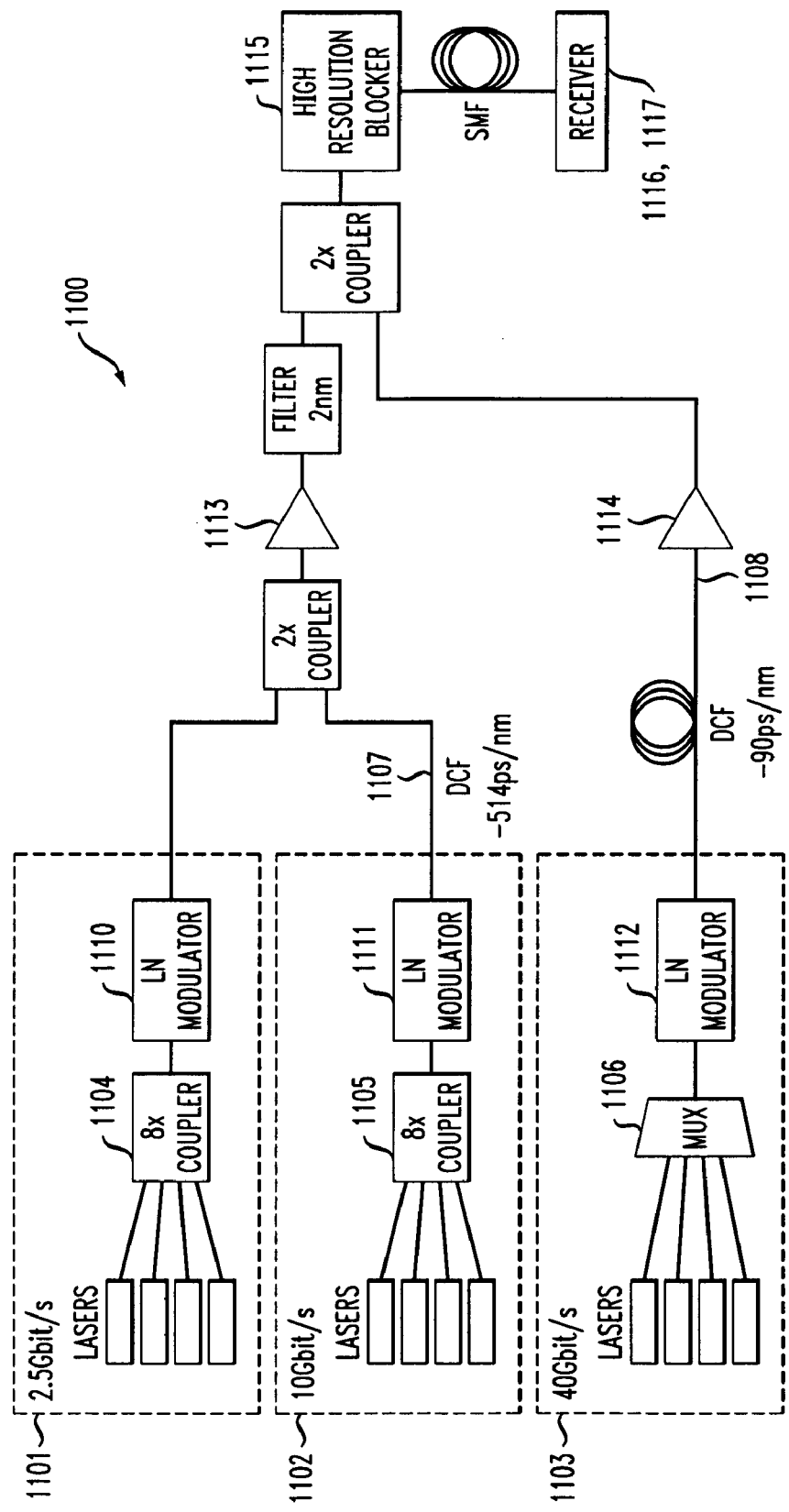

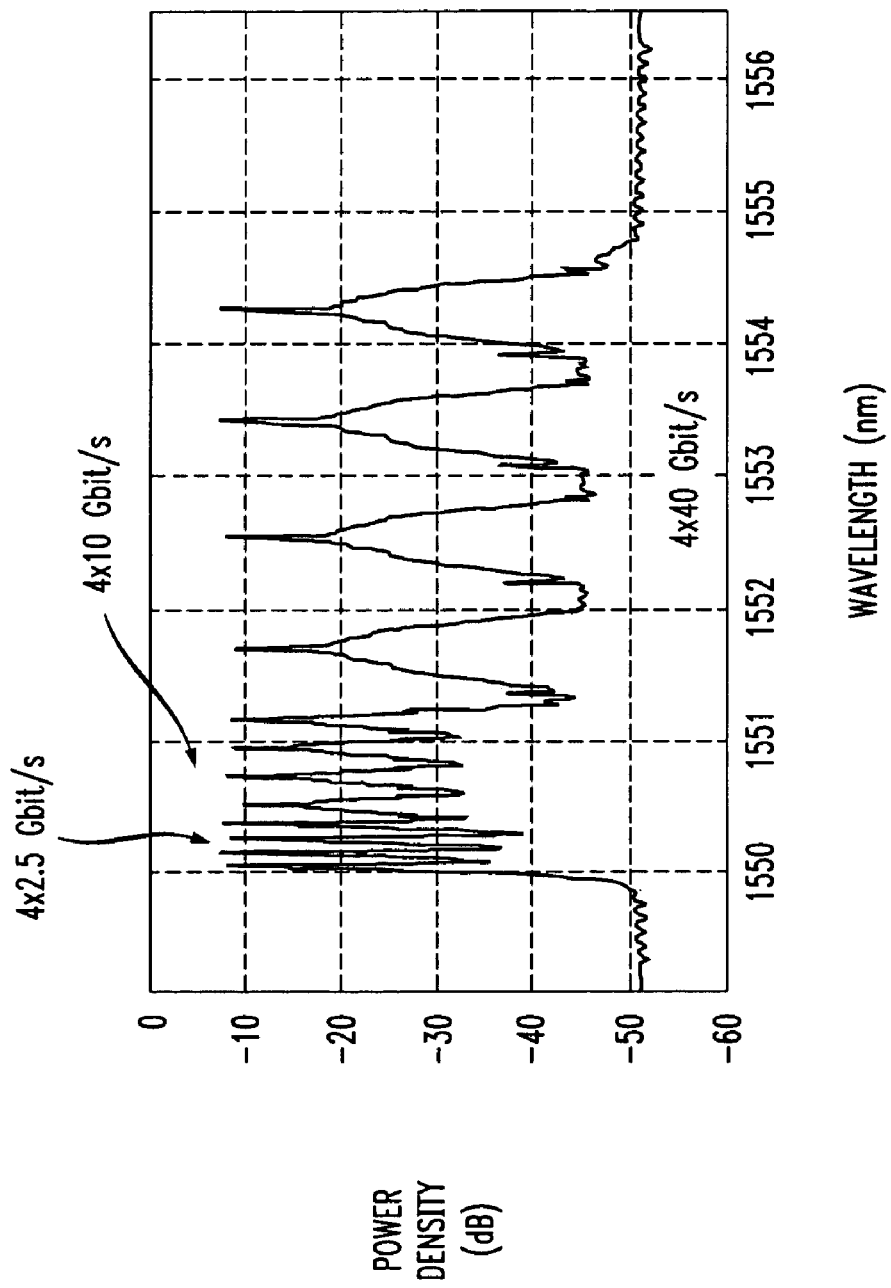

OPTICAL DEVICE WITH CONFIGURABLE CHANNEL ALLOCATION

CROSS-REFERENCE TO RELATED APPLICATIONS

The present patent application is a continuation-in-part of U.S. patent application Ser. No. 09/944,800, filed Aug. 31, 2001, now U.S. Pat. No. 6,657,770, entitled Programmable Optical Multiplexer/Demultiplexer and is commonly assigned herewith. The contents of the aforementioned application are fully incorporated herein by reference.

TECHNICAL FIELD

The invention relates generally to optical devices for the discretionary treatment of channels of an optical beam, and, more specifically, to optical devices having reflective elements for switching, filtering, and multiplexing/demultiplexing channels of an optical beam.

BACKGROUND

Essential to any optical telecommunication system are optical assembles for switching, filtering, and multiplexing/demultiplexing optical signals. For example, the use of wavelength division multiplexing (WDM) techniques has increased significantly the transmission capacity of fiber-optic communication systems. In a WDM communication system, multiple channels, in which each channel is differentiated by using a unique wavelength of light, carry modulated optical signals in a single optical fiber between a transmitter and a receiver. The transmitter uses an optical multiplexer to combine multiple channels into the fiber for transmission, and the receiver uses an optical demultiplexer to separate the optical channels for detection. Multiplexers and demultiplexers therefore are essential for the high transmission capacity of state-of-the-art optical systems.

Of particular interest herein are optical assemblies which rely on reflective elements to perform their specific functions. As used herein, the term "optical device" refers to such an optical assembly which uses reflective elements for the discretionary treatment of channels of an optical beam. Examples of discretionary treatment of channels include switching, filtering and multiplexing/demultiplexing channels.

Demands on these optical devices have increased dramatically in recent years as the need for higher transmission capacity in optical systems has increased. In particular, this need has lead to recent innovations in switching techniques such as those disclosed in US Patent Application No. 20020196520, which is hereby incorporated by reference. That application discloses, among other embodiments, a programmable optical multiplexer/demultiplexer. In this device, the WDM channels enter the switch from the central fiber, the light coupled out from the fiber is collimated and imaged on a diffraction grating. The light diffracted from the grating is spectrally separated and focused on an array of micromirrors which are controlled by a micro electromechanical system (MEMS). Each channel of the WDM signal is reflected by a different micromirror. By actuating a particular mirror, a particular channel may be coupled to or decoupled from a particular output fiber. In this way, every wavelength of the WDM signal input can be distributed to any desired output fiber.

Although this development provides for a highly configurable WDM device, the device nevertheless must be designed for channels having particular bandwidths, spacing, and wavelengths. This presents several problems. First, the micromirrors of the OADM must be designed for a specific target bandwidth. Specifically, the spacing of the micromirrors is chosen to map the desired ITU wavelength grid on the mirror center. Because the position of the light spots is linearly spaced in wavelength on the micromirrors and the WDM signals are equally spaced in frequency, the spacing of the mirror is changing across the linear MEMS array. The micromirror design will therefore be a function of both the wavelength band of the WDM signal and the diffraction grating period. The channel frequencies of the device must therefore be precisely aligned with the channel wavelength of the WDM carriers frequencies, requiring a redesign of the microstructure for every different channel configuration. This hardware-specific design prevents the device from being reconfigured as data rates increase. Hence, the device is not upgradable.

Second, since the micromirror must be precisely tailored for particular channels, its positioning within the optical device must be equally precise, typically within 1–5 $\mu$m. Such precision is difficult to achieve and requires active alignment of the micromirror position. It is well known that active alignment is an expensive and time-consuming process that hinders large-scale manufacturing.

Therefore, there is a need for an optical device which is not designed for particular channel parameters and thus can adapt to changing channel bandwidths, spacing, and wavelengths as the optical system evolves. There is also a need for an optical device which does not require active alignment of its components and which lends itself to large-scale manufacturing. The present invention fulfills these needs among others.

SUMMARY

The present invention provides an optical device having configurable reflective elements which exceed the number of channels the device is intended to discretionarily treat and which are not designed specifically for channels of particular bandwidths, spacing and wavelengths.

One feature of such an optical device is that the allocation of reflective elements to channels is performed after the assembly of the device. This offers a number of advantages. First, by using an abundance of generic reflective elements which are allocated to channels after assembly, the device is extremely flexible. The reflective elements may be allocated to any channel position or bandwidth, thereby allowing the device to be configured to support multiple rates and formats after assembly and installation. Thus, it is readily upgradable. Second, since the allocation of reflective elements to channels occurs after assembly, the need to precisely aligned specially tailored, channel-specific reflective elements in the optical device is eliminated. In other words, the initial alignment of the reflective elements is not critical since there are an abundance of available, generic reflective elements which provide a relatively large target for a channel beam and thus greatly relax manufacturing tolerances. Indeed, by offering such a large target, the reflective elements may be disposed in the optical device using passive alignment techniques.

Another feature of the optical device of the present invention is the actuateability of the reflective elements which is particularly advantageous in switching applications. Specifically, the mirrors corresponding to a particular channel may actuate to couple the channel to a desired port, or they may be actuated to miss all the ports entirely and thereby fully attenuate or block transmission of that particular channel.

Still another feature of the optical device of the present invention is that the abundance of relatively small reflective elements provides for subchannel granularity. In other words, each reflective element reflects just a portion of a given channel, allowing that portion of the channel to be controlled independently of the channel as a whole. The principal advantage of subchannel granularity is the ability to tune portions of the channel signal. For example, individual reflective elements may be used to produce arbitrary amplitude or group delay function either within a single wavelength channel or across the supported wavelength band. This filter function can be used to reduce transmission impairment in optical transmission systems.

Accordingly, one aspect of the invention is a highly flexible optical device having an abundance of reflective elements for the discretionary treatment of channels of an optical beam. In a preferred embodiment, the device comprises: (a) a port for at least transmitting or receiving a first beam having a plurality of channels; (b) a wavelength discriminating device optically coupled to the port, the wavelength discriminating device adapted for at least one of receiving the first beam and diffracting the beam into a plurality of channel beams or receiving a plurality of channel beams and combining the channel beams into the first beam; and (c) an array of reflective elements exceeding the number of channels, at least a portion of the reflective elements being optically coupled to the wavelength discriminating device to reflect the channel beams, at least two reflective elements of the portion corresponding to a particular channel beam, the two reflective elements being controllable to effect a desired output of the channel beam. The desired output may be, for example, coupling the channel beam to one or more ports, switching the channel beam among two or more ports, attenuating all or a portion of the channel beam, or tuning/introducing group delay in the channel beam.

Another aspect of the present invention is a method for assembling the optical device which avoids certain low tolerance alignment requirements of more-recently developed devices. In a preferred embodiment, the method comprises: (a) disposing an array of reflective elements in the optical device having one or more ports and a wavelength discriminating device optically coupled to one or more ports such that a portion of the reflective elements is in the optical path of a channel beam optically coupled to the wavelength discriminating device, and (b) adjusting the portion of the reflective elements to optically couple the channel beam to a desired port. Preferably, the array of reflective elements are disposed in the optical device using passive alignment.

Another aspect of the present invention is a method of configuring an optical device for discretionary treatment of channels of an optical beam. In a preferred embodiment, the method comprises (a) operating the optical device such that channel beams are incident on particular reflective elements, wherein at least one channel beam is incident on two or more reflective elements; and (b) manipulating the reflective members to optically couple at least a portion of the channel beams to one or more ports.

Still another aspect of the present invention is a method of switching channels in an optical device having x, y, and z axes and comprising two or more ports along the y-axis, a wavelength discriminating device coupled to one or more of the ports, and an array of reflective elements, at least a portion of the reflective elements being optically coupled to the wavelength discriminating device to transmit or receive the channel beams, at least two of the portion corresponding to a particular channel beam. In a preferred embodiment, the method comprises rotating each reflective element of the portion about an axis parallel to the x-axis to switch the optical coupling of the particular channel from one port to another port along the y-axis.

Yet another aspect of the present invention is a method of tunning a channel in an optical device having x, y, and z axes and comprising at least one port, a wavelength discriminating device coupled to the port, and an array of reflective elements, at least a portion of the reflective elements being optically coupled to the wavelength discriminating device to transmit or receive the channel beams, at least two reflective elements of the portion corresponding to a particular channel beam. In a preferred embodiment, the method comprises rotating selected reflective elements of the portion about the y-axis to produce a desired group delay profile in the channel signal. Preferably, the method further comprises rotating selected reflective elements of the portion about an axis parallel to the x axis to achieve a desired transmission profile.

BRIEF DESCRIPTION OF THE DRAWINGS

FIG. 11 shows the embodiment of the present invention in Example 2.

FIG. 12 shows the power density as a function of wavelength from Example 2.

DETAILED DESCRIPTION

Figure 1:
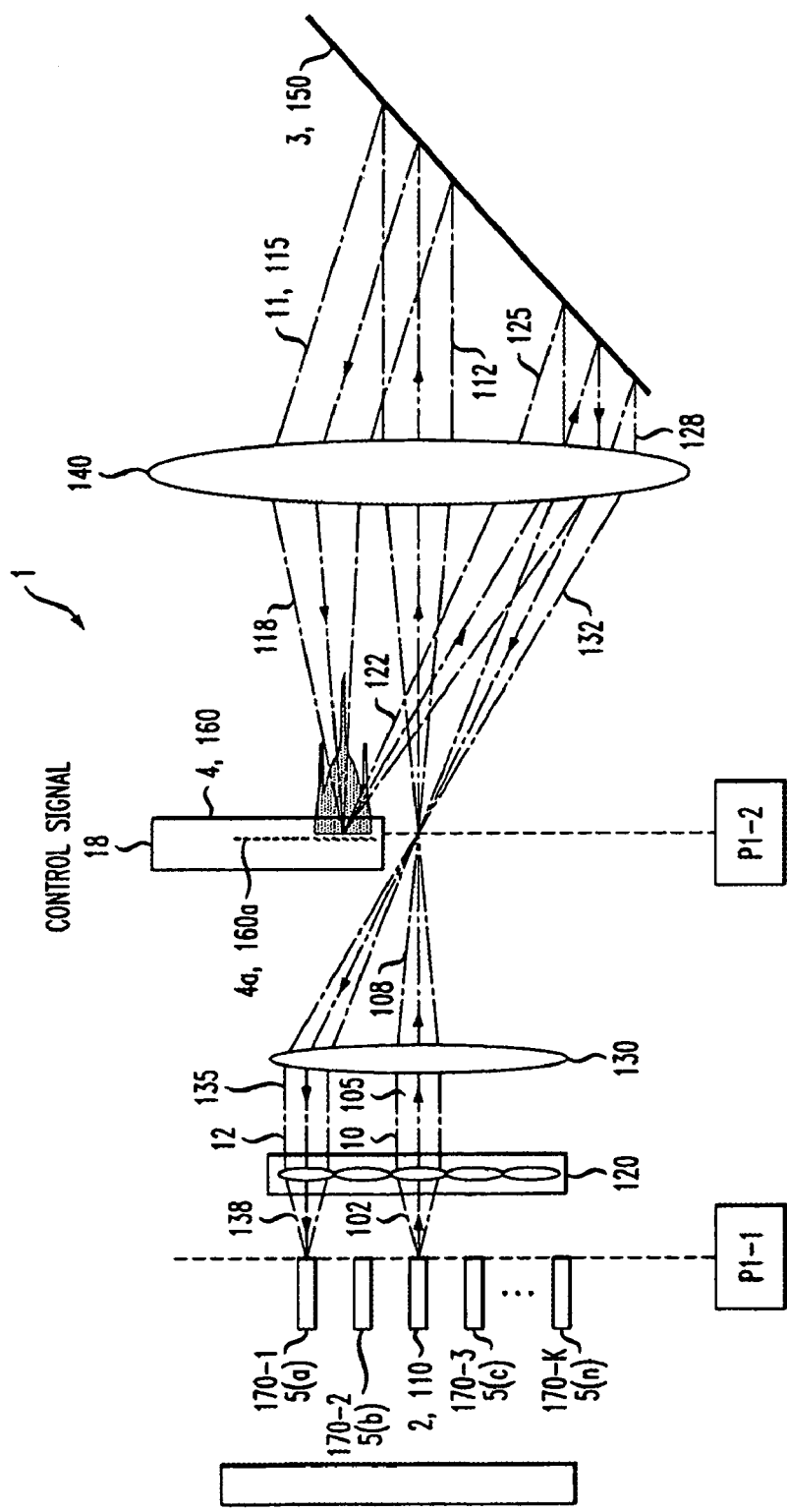
FIG. 1 shows a schematic of the present invention embodied in an optical add drop multiplexer (OADM).

Referring to FIG. 1, an optical device 1 is shown for discretionary treatment of channels of an optical beam. The optical device 1 shown in FIG. 1 is an optical add drop multiplexer (OADM), however, it should be understood that the invention is not limited to this embodiment. Indeed, the invention may be applied to other optical devices such as, for example, filters, switches, transmission and group delay filter, and spectral equalizers.

The optical device 1 comprises a port 2 for at least transmitting or receiving a first beam 10 having a plurality of channels. The optical device also comprises a wavelength discriminating device 3 optically coupled to the port 2. The wavelength discriminating device 3 is adapted for at least one of receiving the first beam 10 and diffracting the beam into a plurality of channel beams 11 or receiving a plurality of channel beams 11 and combining the channel beams into the first beam 10. The optical device also comprises an array 4 of reflective elements 4a. The reflective elements 4a exceed the number of channels in the first beam 10. At least a portion of the reflective elements 4a are optically coupled to the wavelength discriminating device 3 to transmit or receive the channel beams 11. Of the portion of reflective elements 4a optically coupled to the wavelength discriminating device, at least two reflective elements correspond to a particular channel beam 11. These at least two reflective elements are controllable to effect a desired output of the particular channel beam. Each of these elements is discussed below in greater detail and with respect to alternative embodiments.

The port 1 functions to input and/or output the beam comprising a plurality of channels. Any known waveguide is suitable including, for example, optical fibers and planar waveguides. As described herein, the ports comprise fibers unless otherwise noted.

Several port configurations are possible. For example, as shown in FIG. 1, the optical device 1 may comprise secondary ports 5(a)–(n) in which each secondary port receives or transmits a secondary beam 12 having an equal or fewer number of channels than the beam 10. The secondary beam 12 may be a single channel beam or multichannel beam. The main port and the secondary ports may be configured as input and output ports depending on the application. For example, in a demultiplexing application, the main port is an input port and the secondary ports are output ports. On the other hand, in a multiplexing application, the main port is an output port and the secondary ports are import ports. In other applications, it may be preferable to have the secondary ports be a combination of input and output ports, or to have the main port act as an input and an output port such that it transmits the beam and receives a secondary beam (see, for example, the embodiment shown in FIG. 9 and associated text in Example 1).

The wavelength discriminating device 3 functions to split channels of a common beam into two or more channel beams and/or to combine two or more channel beams into a common beam. The wavelength discriminating device may be any device suitable for spectral separation including, for example, a diffraction grating, prism, and an arrayed waveguide grating (AWG). In a preferred embodiment, the wavelength discriminating device is a diffraction grating. Such grating are preferred as they function to perform both the splitting and combining functions passively. As described below in detail, the wavelength discriminating device may be configured in a number of different ways. Generally though, it is optically coupled between the main port and the reflective elements in at least one direction of light propagation and perhaps both as shown in FIG. 1.

The reflective elements function to provide a wide area upon which to reflect particular channel beams in a discriminating fashion to effect a desired output for one or more of the channel beams. The desired output may be, for example, to selectively couple the channel beam to the main port and/or secondary ports, attenuate all or a portion of the channel beam, or tune the channel beam. Specifically, a relative large number of reflective elements are used such that at least two of the reflective elements reflect a single channel. (It should be understood that these elements can each control the beam propagation of groups of multiple channels that are contiguous in the wavelength domain.) By having a number of reflective elements that significantly exceeds the number of channels and allocating a plurality of reflective elements for each channel, the optical device is made highly configurable. As discussed below, this configurability allows the optical device to be configured for a wide range of channel bandwidths and spacings. Thus, the same optical device may be configured and reconfigured to control the beam propagation of different channels. Furthermore, given the wide "target" offered by the relatively large number of reflective elements, variable channel spacing can be accommodated. The ability of the reflective elements to actuate also allows them to manipulate channels, either for purposes of switching or filtering. Indeed, with respect to the latter, the use of multiple reflective elements for a single channel allows a single channel to be tuned—i.e., selected portions of the channel maybe attenuated to shape the channel to a desired form.

The reflective elements may be any know reflective device and may include, for example, mirrors, prisms, spatial light modulators (based on liquid crystal, acousto-optic, electro-optic devices, etc.), other mirror combinations, switched volume holograms or photonic crystals, etc. As described herein, the reflective elements comprise micromirrors controlled by a MEMS, although it should be understood that other known reflective elements may be used.

To achieve the desired channel output and to avoid spectral gaps in the bandpass of the channels produced by the gaps between the mirrors, these mirrors have to be sized, arranged and moved in particular ways.

The size of the mirrors can vary depending upon the application and desired features. When referring to mirror size, the distance along the bandwidth of the channel will be referred to herein as the "width," and the distance across the channel will be referred to as the "length." Although the mirrors disclosed herein are rectangular in shape, it should be understood that other shapes, such as polygons, are possible. One skilled in the art can readily apply the terms of width and length to these shapes as well. With respect to mirror width, smaller mirrors reduce the granularity of the device which is generally preferred from the standpoint of flexibility and interchannel tuning. Furthermore, as discussed below, smaller mirrors are easier to move and maintain certain distance relationships between mirrors of a given channel (see Equation 1 below). On the other hand, smaller mirror surfaces are more complex to manufacture and operate. Therefore, sizing the mirrors will be an optimization of these factors. Generally, the mirror size will be a function of the spot size of a non-modulated channel beam in the plane of the mirror, and spot size, in turn, will be a function of the optical components and their configuration in the device (e.g., the dispersion of the grating used and the focal length of the lens). In one preferred embodiment, the mirror width is about 2 to about 5 times larger than spot size. For example, if the spot size of the non-modulated beam is 10 $\mu$m, the mirror width is preferably about 20 to about 50 $\mu$m. In a second preferred embodiment, the mirror width is about 2 to about 20 times smaller than spot size. For example, if the spot size is about 10 $\mu$m as above, the mirror width would be about 0.5 to about 5 $\mu$m. As mentioned above, although the smaller mirrors are preferable from the standpoint of being less sensitive to distance variations between reflective elements for similar channels (see Equation 1 below), substantially more mirrors are required than in the first preferred embodiment and, consequently, the MEMS needed to support such an array is significantly more complicated.

It should be understood the spot size for a modulated channel will be greater than its non-modulated spot size.

Typically, the spot size of a modulated channel will be about 2 to 4 times greater than that of a non-modulated beam, and perhaps even higher for higher frequency modulations. Therefore, even with the larger size mirrors (as mentioned above in the first preferred embodiment), the spot size of a modulated signal will be larger generally than the width of a single reflective element.

Since the length of the mirror does not affect granularity of the device (i.e., it is not associated with a portion of the channel bandwidth), there is no reason to minimize its size for this purpose. Nevertheless, due to the parameters described below with respect to distance variations between reflective surfaces of similar channels (see Equation 1 below), it makes sense minimize the length of these mirrors as well. Preferably, a mirror length is about 1.5 to about 2 times larger than the non-modulated spot size. Generally, the mechanical design will limit the maximal mirror length.

Since two or more adjacent mirrors are assigned to the same channel in the present invention, these adjacent mirrors must act as a single large mirror. This can be achieved with small transmission penalty if the gap between the mirrors is kept small compared to the spot size produced by a mochromatic input signal. In general, a mirror array with large linear fill factor of no less than 95% is preferable. More preferably, the linear fill factor is no less than about 98%.

Figure 2:
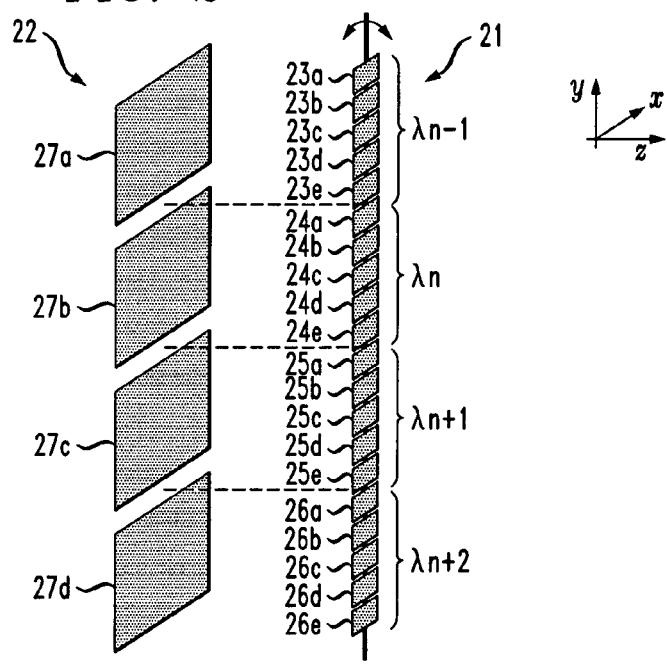
FIG. 2 shows a schematic of a linear array of micromirrors of the present invention compared to the micromirrors of a recently-development OADM.
Figure 3:
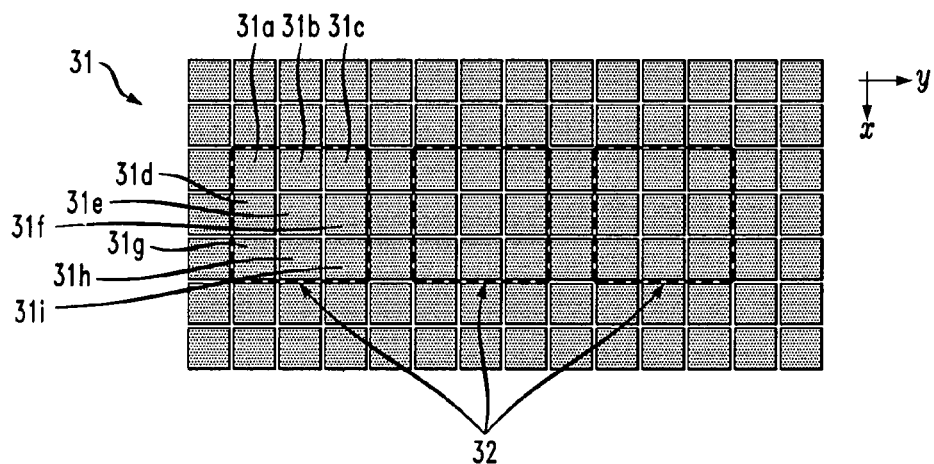
FIG. 3 shows a two-dimensional array of micromirrors with the position of larger micromirrors of a recently-developed OADM superimposed upon it with dotted lines.

The reflective elements may be arranged in essentially two ways, a linear array and a two-dimensional array. Referring to FIG. 2, a linear array 21 is shown in comparison to a linear array 22 of mirror in which each channel is reflected by a single mirror. As shown, groups of smaller mirrors 23(a)–(e), 24(a)–(e), 25(a)–(e), and 26(a)–(e) are assigned to channels, λn−1, λn, λn+1, λn+2, respectively. This is a departure from recent developments in which each channel is associated with a single dedicated mirror 27a, 27b, 27c, and 27d, repetitively. Referring to FIG. 3, a two-dimension array 31 of mirrors is shown. Here, a region of multiple mirrors 31(a)–(i) replaces a single mirror 32 as used in recent OADM developments (represented by a superimposed dotted line over the micromirrors). The advantages of these mirror arrays is described below with respect to their movement and features.

Figure 4:
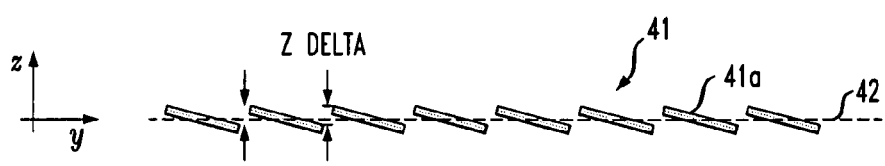
FIG. 4 shows mirrors tilting about an axis parallel to the x axis and indicates the z delta of such mirror movement.

With respect to FIG. 2 and FIG. 4 the movement of the reflective elements will be addressed. The reflective elements may be moved to set positions (e.g., a two position mirror) or they may be adjusted anywhere between two end positions. Preferably, the reflective elements are continuously adjustable between two end positions. For purposes of illustration, the movement of the reflective elements will be described with respect to the x, y, and z axes, in which the z axis is the optical axis. Generally, the reflective elements are adapted to have their reflective surfaces moveable in at least one of three directions, a first direction in which the reflective surface is rotated about the y axis, a second direction in which the reflective element is rotated about an axis parallel to the x axis, and a third direction in which the reflective surface is moved along the z axis. In a preferred embodiment, the reflective elements move in two or more of the directions mentioned above.

As shown in FIG. 1, the reflective elements are aligned along the y-axis. In one embodiment, the reflective elements move about the y-axis (i.e., the first direction) to effect the optical coupling of a channel beam to one or more of the ports along the x axis. (It should be noted that, to couple the channel beam to a desired port in the embodiment of FIG. 1, the secondary ports 5(a) to 5(n) in the embodiment of FIG. 1 should be rotated 90° to be aligned with the x-axis if the reflective elements are turned about the y-axis (or an axis parallel to the y axis).)

The orientation of adjacent mirrors for a common channel is critical to avoid spectral gaps in the bandpass of a channel. Specifically, for adjacent mirrors of a common channel, a certain distance must be maintained along the z axis between the edge of a reflective element of one mirror and the adjacent edge of the reflective surface of the other mirror. This distance is referred to herein as the z delta. In the embodiment in which reflective elements are revolving around a common axis, to maintain a uniform reflection of a given channel beam, the z delta should be less than λ/8, where λ, is the average wavelength of the channel. For example, for a channel beam with a wavelength of 1.5 μm, the maximum z delta is 0.2 μm. Therefore, in this example, assuming that the mirrors rotate about a centrally located y axis, for a mirror having a width of 30 μm, the maximum angle difference between the mirrors would be 0.4°. The requirement can be relaxed for an arrangement where the tilt axes of the micromirrors is aligned with the center lines of the spectral spot in the plane of the array of reflective elements. In this situation, the error in difference in tilt angle between adjacent mirrors will produce steady variation of the transmission within the signal passband.

In another embodiment, the reflective elements rotate about an axis parallel to the x axis (i.e., in the second direction). This direction of rotation is orthogonal to the alignment axis of mirrors of a common channel. This is the direction the mirrors are rotating in the embodiment shown in FIG. 1. If the wavelength discriminating device is tilted with respect to the reflective elements (as it is in the embodiment shown in FIG. 1), the mirrors of a common channel must tilt at varying angles to couple the beam to the desired port. However, when tilting the reflective elements orthogonal to their axis of alignment, it has been found that the z delta for a common channel must comply with the following:

$$\lambda/2n - \lambda/8 \leq z\ delta \leq \lambda/2n + \lambda/8 \qquad \text{Equation (1)}$$

wherein n is 0 or an integer (preferably 1–1000), and λ is the average channel wavelength. The presence of a jump which is not 0 or a multiple of λ/2 will create a narrow notch in the transmission spectrum of the switch. In some applications this notch may be desired, but, for optical transmission, it is generally not desirable.

Therefore, if mirrors of a common channel cannot effect switching with a maximum orthogonal tilt (e.g., 8 for a 30 μm mirror), the mirror must be moved along the z axis (i.e., the third direction) to comply with Equation 1. It is worthwhile to note, however, that only a small movement of the mirror in this direction may be required. For example, for a mirror with a width of 30 μm and a maximal tilt of 8°, the z delta between it and an adjacent mirror may be as large as 6 μm. However, since the z delta may be a multiple of λ/2, only a motion of a fraction of 1 μm is required. An example of such a configuration is shown in FIG. 4 in which an array 41 of reflective elements 41a are located in various positions along the z axis 42 such that their delta z is in compliance with Equation 1. (Note that this figure is not to scale and the distance variations along the z axis are exaggerated.)

The ability to tilt each of the individual mirrors in mirror array 21 or 31 to one of multiple states may be performed using various techniques, but preferably is performed using a micro electromechanical system (MEMS) which is controlled by an electrical voltage. Since unique mirror tilt is required to select a desired coupling port, there is a unique voltage corresponding to this tilt and port. The necessary voltage to control each output port for every wavelength component of the WDM system can be measured and stored in a database. In operation, a command requests a specific output port for each communication channel. The device controller then obtains from the database the necessary voltages to set the mirrors in the mirror array and applies the required voltage to each mirror.

The arrangement of the reflective elements and their movement provides the optical device of the present invention with desirable features including (1) post assembly allocation of reflective elements to channels; (2) switching capacity; and (3) interchannel tuning.

(1) Allocation of Reflective Elements to Channels After Assembly

The configurable nature of the optical device of the present invention has a number of features that makes it suitable for a variety of applications. Specifically, since the optical device is provided with a significant excess of mirrors to channels, it can allocate certain mirrors to particular channels depending upon the bandwidth and spacing of the channels after assembly. Consequently, it can be used as a universal platform for a grating based OADM, independent on the absolute wavelength, channel position, channel spacing, and passband. For example, in the embodiment of FIG. 1, the optical device can be reconfigured for different channel bandwidths and spacings simply by rotating the mirrors about an axis parallel to the x axis and mechanically adjusting the wavelength discriminating device. In contrast, recently-developed OADMs would required a new design of the micromirrors for every change in the WDM wavelength allocation.

Figure 5:
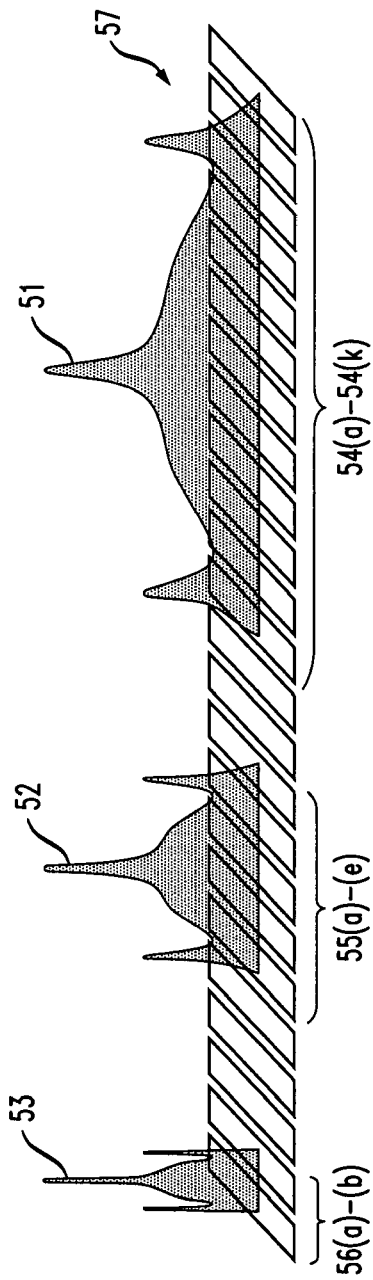
FIG. 5 shows the allocation of micromirrors to channels of different data rates.

Referring to FIG. 5, an array of mirrors is shown after being adjusted to reflect channels of varying data rates. Specifically, once the channel beams are reflected upon the array, the mirrors corresponding to certain channels (i.e., those mirrors which are in the optical path of the channel beam) can be adjusted to couple the beam to the desired port with a certain degree of rotation. In this example, channel beams 51, 52, and 53 are incident upon the mirror array 57. The mirrors which lie in the optical path of the channel beams are allocated to those beams. Thus, mirrors 54(a)–54(k), 55(a)–55(e) and 56(a)–56(b) are allocated to channel beams 51, 52, and 53, respectively. Since channel beam 51 has a higher data rate than beam 52, and beam 52 has a higher data rate than beam 53, more mirrors are allocated for beam 51 than are allocated for beam 52, and more mirrors are allocated for beam 52 than are allocated for beam 53. Such a dynamic allocation of mirrors allows the optical device of the present invention to adapt to any channels used.

Figure 6:
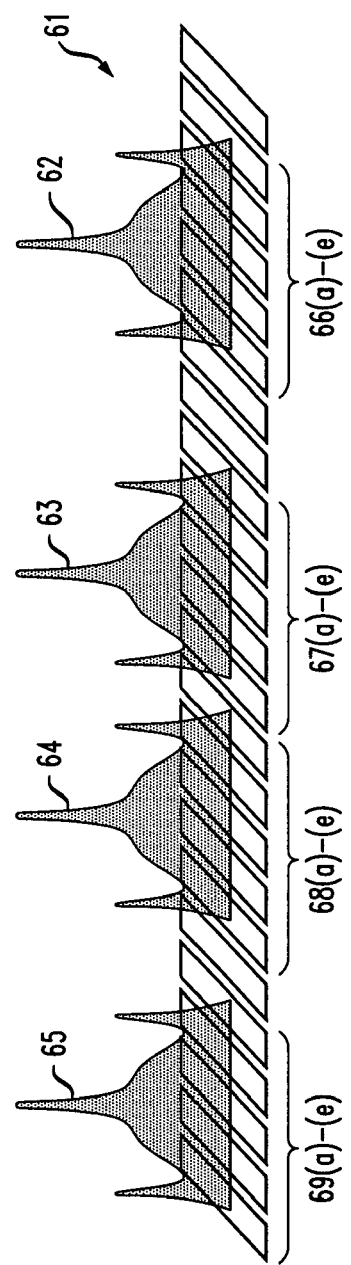
FIG. 6 shows the allocation of micromirrors to channels which are non-uniformly spaced.

Furthermore, the dynamic allocation of mirrors to channels also enables the array to accommodate non-uniformly spaced channels. As mentioned above, in recently developed optical devices, the spacing of the micromicron is chosen to map the desired ITU wavelength grid on the mirror center. Because the position of the light spots is linearly spaced in wavelength on the micromirrors, and the WDM signal are equally spaced in frequency, the spacing of the mirror is constantly changing across the linear array of reflective elements. The present invention can accommodate this random spacing. For example, referring to FIG. 6, channels of similar bandwidth but at different wavelengths and with different spacing are shown incident upon various mirrors of the array 61 of the present invention. In particular, channels 62, 63, 64 and 65 are incident upon mirrors 66(a)–(e), 67(a)–(e), 68(a)–(e), and 69(a)–(e), respectively. It should be understood that if, for example, channel 62 was offset one mirror to the left of its current location, than the allocation of mirrors in array 62 would similarly be shifted left by one mirror.

Having an abundance of reflective elements reduces the manufacturing tolerances typical of such optical devices. Specifically, the large number of mirrors used relative to the number of channels provides a wide "target" to receive particular channel beams. This wide target therefore reduces the need to precisely position the reflective element array in the optical device. That is, rather than having to position the reflective elements in a precise position such that a channel beam would be incident upon a particular reflective element, the array of reflective elements can be simply placed in the vicinity of the channel beams and the particular reflective elements that happen to be in the optical path of a channel beam can be subsequently adjusted such that the channel beam is coupled to the desired port.

Relaxing the need for precision alignment allows for simplified manufacturing techniques, such as passive alignment, to be used in positioning the reflective elements in the optical device. Historically, the positioning of the reflective element in the optical device was performed using active alignment techniques. In a preferred embodiment, the assembly method comprises (a) disposing an array of reflective elements in an optical device having one or more ports and a wavelength discriminating device such that a portion of the reflective elements is in the optical path of a channel beam, and (b) adjusting the portion of the reflective elements to reflect the channel beam to couple with a desired port. In a preferred embodiment, the reflective elements are disposed in the optical device using passive alignment.

Therefore, by providing a wide "target" of reflective elements to optically couple with the desired channels, less precision is required in initially installing the reflective elements. Of course, the larger the target (i.e., the larger the array of reflective elements), the less precision is required in positioning the reflective elements in the optical device. It has been found that the invention reduces the alignment precision required for the manufacturing of an OADM by a factor of 10 using a linear array since there is no need to precisely align along the y axis. This factor increases to 100 using a two dimensional array since there is no need to precisely align along the x and y axes.

(2) Switching

Figure 7:
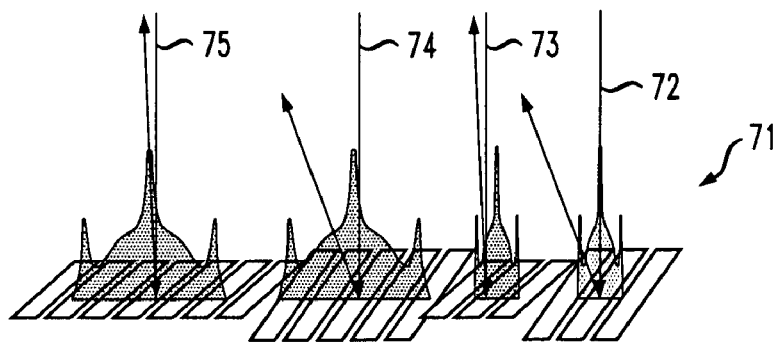
FIG. 7 shows the actuation of micromirrors to effect the switching of various channels.

Aside from the flexibility offered by an abundance of reflective elements which can be allocated to channels of varying bandwidths, spacing, and wavelength after assembly, the actuateability of the mirrors also is advantageous for switching applications. For example, referring to FIG. 7, reflective elements in an array 71 are actuated about their common axis to alter the directions of channel beams 72, 73, 74 and 75. By altering the direction of the beams, the beams may be coupled to particular ports. Specifically, the mirrors corresponding to a particular channel may actuate to precisely couple the channel to a particular port, or they may be actuated to miss all the ports entirely and thereby fully attenuate or block transmission of that particular channel, or some of the mirrors may be actuated to couple a fraction of their light to a particular port to effectively attenuate a portion of the channel for tuning purposes as described below. In the configuration shown in FIG. 1, movement of the reflective elements about an axis parallel to the x axis effects the optical coupling/decoupling to ports along the y axis. It should be understood, however, that the reflective elements may be rotated alternatively about the y axis to couple/decouple with ports aligned along the y-axis as in a two-dimensional array of ports.

(3) Innerchannel Tunning

The present invention also provides for interchannel tuning which facilitates new functionality, such as a programmable passband filter and a programmable group delay filter. Specifically, since portions of a given channel are reflected by individual mirrors, the delay and attenuation of these portions of the channel may be controlled.

With respect to the configuration of FIG. 1 in which the wavelength discriminating device is angled with respect to the reflective elements, the attenuation or switching produced by mirrors tilting laterally (i.e., along an axis parallel to the x-axis) will result in a change in group delay which is linearly dependent on the tilt angle of the mirrors. That is, the reflected beams from mirrors of a common channel will have optical paths of varying lengths. If the mirrors within a common channel are tilted by different angles, a wavelength dependent attenuation and wavelength dependent group delay will result. Although the attenuation and group delay will not be independent of each other, for a small tilt angle, the attenuation will be negligibly small and thus produce controlled group delay profiles and therefore chromatic dispersion. The amount of group delay that can be produced will also depend on the optical design and the use of anamorphic optics in the input stage of the switch.

Figure 8A:
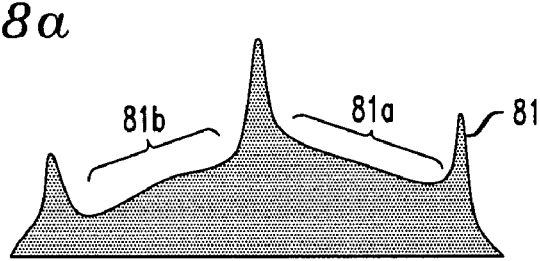
FIGS. 8a through 8c show a schematic of spectral reshaping.
Figure 8B:
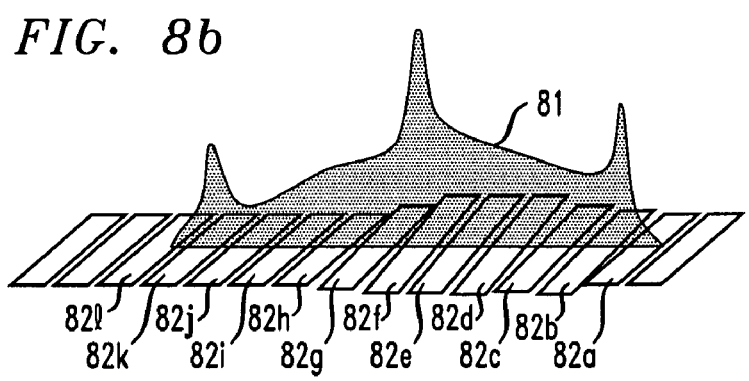
Figure 8C:
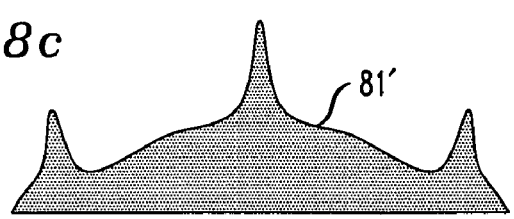

Referring to FIGS. 8a–8c, the interchannel tuning features of the present invention will be addressed. In FIG. 8a, an asymmetrical signal 81 of a channel is depicted in which a portion 81a has a higher magnitude than portion 81b. In FIG. 8b, that signal is shown incident upon a number of mirrors 82(a)–82(l). The mirrors are oriented differently about their common axis to selectively attenuate portions of the signal. Specifically, mirrors 82(b)–(g), which correspond to portion 81a of the signal, are angled differently from the other mirrors, with mirrors 82(d)–(f) being more severely angled than the other mirrors. Mirrors 82(d)–(f) correspond to the central region of portion 81a. The result of the different mirror angles results in an attenuation of portion 81a of the signal 81', with the attenuation corresponding to mirrors (d)–(f) being most severe. This attenuation serves to reduce the magnitude of the signal in portion 81a and thereby render the signal more symmetrical over the bandwidth which is desirable.

Although interchannel signal shaping was depicted in FIG. 8 using a single axis tilt of the mirrors, it should be understood that two-axis tilting of the mirrors affords even greater versatility in tuning the signals. The lateral tilt may be used to produce a desired group delay profile, and the tilt around the y-axis may be used to achieve a desired transmission profile and/or switching function. As in the earlier situation, an out-of-plane adjustment (z direction) may be required to adjust the phase jumps acting on the light beam between two adjacent mirrors in compliance with Equation 1. Application of this feature is of particular interest for impairment mitigation in high data rate transmission (40 Gbi/s and more).

The flexibility and versatility of the reflective element array of the present invention may be practiced in a wide variety of optical devices. For illustrative purposes, its application in an OADM is considered in detail herein with respect to FIG. 1. FIG. 1 is an illustration of an embodiment of the present invention using tilting micro-mirrors and functioning as a programmable demultiplexer. Main port 2, which in this embodiment is an import port 110, typically a single mode optical fiber, carries an input optical signal that contains multiple optical wavelengths $\lambda$-1 through $\lambda$-N of a DWDM communication system. To accomplish the demultiplexer function, it is desired that each of these wavelengths be assigned to one of the various output ports 170-1 through 170-k, as instructed by a provided control signal 18. Note that it is possible for more than one wavelength to be assigned to the same output port, and that the number k of output ports does not have to be equal to the number N of wavelengths in the input optical signal.

As shown in FIG. 1, the optical beam 102 emerging from input port 110 is rapidly diverging, due to diffraction effects. A micro-lens array 120 is aligned with and spaced apart from input port 110, as well as with output ports 170-1 through 170-k, such that the ports are at the micro-lens front focal plane, denoted as plane P1-1 by the dotted line in the figure, and each port is on the optical axis of its matching micro-lens. The effect of the individual micro-lens that is aligned to the input port 110, is to collimate the diverging beam 102 to a wide beam 105, whose diffraction effects are greatly reduced. A high numerical aperture lens 130, whose clear aperture contains all the micro-lenses in array 120, focuses the beam 105 at its back focal plane, denoted as plane P1-2 by the dotted line in the figure. The beam diverges from this point.

The diverging beam 108 is collimated by a second lens 140, that is placed such that its front focal plane coincides with plane P1-2, resulting in the beam 112 that still contains all of the input optical channels. Beam 112 is directed onto a wavelength discriminating device 3, which in this embodiment is a reflection diffraction grating 150, that introduces wavelength dependent diffraction and serves to separate the optical channels, so that each channel can be independently accessed. An illustrative diffracted beam 115, propagating at a unique direction or angle with respect to grating 150, contains only a single optical channel at a particular wavelength $\lambda$-j. The diffracted beam 115 propagates back through the lens 140, which focuses the beam 118 at the lens's front focal plane, plane P1-2. There will be N such beams, one for each wavelength $\lambda$-1 through $\lambda$-N, each propagating at a slightly different direction. It is thus seen that the optical subsystem consisting of the lens 140 and diffraction grating 150 serves to spatially separate the optical channels at plane P1-2. One proficient in the field can design the optical system to provide the sufficient spatial separation of the wavelength channels at this plane. Note that FIG. 1 traces only the single wavelength $\lambda$-j for simplicity.

A micro-mirror array 160 is placed at plane P1-2, such that at least one optical channel is focused on a plurality of mirrors 160a of the array 160. The plurality of reflective elements corresponding to a single channel can be tilted by an electrical control signal 18, such that the reflected beam 122, now diverging, is propagating at a new, desired direction.

In the arrangement of FIG. 1, diverging beam 122 is collimated by lens 140, and the collimated beam 125 is diffracted off reflective grating 150, resulting in beam 128 that is propagating back towards the device output ports. Lens 140 focuses beam 128, converting it to a converging beam 132 which focuses the beam at plane P1-2 (front focal plane of lens 140). Beam 132 diverges after passing plane P1-2 and is recollimated by lens 130, resulting in beam 135. Beam 135 is focused by one of the micro-lenses of the micro-lens array 120, with the focused beam 138 at plane P1-1 and coupling to the desired one of the output ports 170-1 through 170-K. The output port is selected for each wavelength by the beam propagation direction that is imparted by the tilt of the individual mirrors in mirror array 160.

By virtue of the arrangement of FIG. 1, each wavelength is controlled separately by a number of mirrors 160a, and it is therefore possible to assign each wavelength independently to any output port and to perform interchannel tuning across the channel bandwidth. In other words, the invention allows the input optical wavelength channels to emerge on any desired output port with any desired profile. The arrangement just described also advantageously permits one or more of the output ports 170-1 through 170-k to receive more than one optical beam and consequently more than one wavelength. This is because the mirrors in array 160 are arranged to reflect the beams back through the same wavelength dependent imaging system (consisting of lenses 140, 130, 120 and grating 150) and the imaging system is designed to convert the propagation directions of all reflected beams off the micro-mirror array simultaneously to their desired output ports. However, it is to be noted that, when there is no need to have more than one optical beam received at a single output port, the spatially separated wavelengths reflected by the individual mirrors in micro-mirror array 160 can be directed back toward output ports 170-1 through 170-k in other imaging arrangements in addition to the arrangement of FIG. 1. In such other arrangement, it is not essential that the paths include a second passage through lens 140 nor a second incidence on grating 150. Rather, a person skilled in the art will recognize that the tilt imposed by the micro-mirror corresponding to wavelength $\lambda$-j in array 160 determines to which output port that particular wavelength channel will couple, and that various different arrangements can be used to direct the output of the micro-mirrors to the individual output ports.

While input port 110 and output ports 170-1 through 170-k in FIG. 1 are shown as a linear (one dimensional) array, and the individual mirrors in micro-mirror array 160 have a single rotation axis to reflect the beam in the directions that correspond to the desired output ports, it is to be understood that the input and output ports may also be arranged in a two-dimensional array, filling the input plane more efficiently. In this case, the individual mirrors in the micro-mirror array 160 must have two orthogonal rotation axes to reflect the beam in the directions that correspond to the desired output ports.

The programmable demultiplexer depicted in FIG. 1 can be operated as a programmable multiplexer, by using ports 170-1 through 170-k as the input ports and port 110 as the output port. Each of the elements in FIG. 1 then operates in a manner that is the "reverse" of that just described. Specifically, using an input on port 170-1 as an example, the diverging beam output 138 from that port is collimated by particular aligned lens in lens array 120, and directed through lens 130 to lens 140, where the now again diverging beam is collimated and applied to grating 150. The geometry of the arrangement is such that the reflected beam from grating 150 (as well as all of the other reflected beams for the other input wavelengths and ports) are directed back through lens 140 to a specific one of the mirrors in array 160. These mirrors are arranged, in accordance with the invention, to reflect the beams back through lens 140 to the appropriate point on grating 150 such that all of the beams are reflected from the grating through lens 140 and then through lens 130, finally being all incident on the single output port 110.

The arrangement of FIG. 1 can also be easily modified to operate as a wavelength switch, Instead of having a single input port and k output ports (in the programmable demultiplexer case), the k+1 device ports are redistributed such that there are r input ports and s output ports (where k+1=r+s). The micro-mirrors in array 160 can establish an independent connection for every input wavelength that appears on one of the r input ports to any one of the s output ports.

As the trend of increasing number of optical channels in a WDM system continues, it is likely that the number of output ports K in the programmable demultiplexer (or input ports in programmable multiplexer mode) will not continue to increase at the same rate, resulting in a desire to have an arrangement that has fewer ports relative to a larger number of channels N (i.e., K<<N). To address this situation, it is possible to use the programmable demultiplexer (or programmable multiplexer) in a cascade arrangement or architecture. The first programmable demultiplexer can assign any K channels to each of its output ports. These K channels will be separated to individual output ports by the following second stage programmable demultiplexer. This architecture increases the number of available output ports from K to $K^2$. (Note that the cascaded demultiplexers are not each required to have the same number of ports, K; if one demultiplexer had K ports and another had K' ports, then the total ports for the cascade arrangement would be K . . . K'.) If required, the cascading approach can be continued until all channels can be assigned to separate output ports. The cascading architecture is also compatible with typical system deployments, which begin with few utilized wavelengths out of the N possible wavelengths. Initially, a few programmable demultiplexers may be deployed; as the number of operating wavelengths grows, more programmable demultiplexers can later be inserted. This solution provides a low system roll-out price with a "pay as you grow" architecture.

Based on the foregoing, it is seen that a programmable optical multiplexer/demultiplexer module, which can establish any connection between the input and output ports of the module for each wavelength independently, has been described. The programmable multiplexer/demultiplexer device has an optical arrangement for spatially dispersing the optical wavelengths, and tunable (or tilting) micro-mirrors for beam steering and tunning each channel independently. Controlling the beam reflection direction determines the connectivity between the input and output ports at the wavelength level. The functionality afforded by the present invention may become of utmost importance as optical networks with wavelength reconfiguration emerge.

EXAMPLES

The following nonlimiting examples demonstrate the performance of different optical devices using multiple reflective elements per channel in accordance with the present invention.

Example 1

High-Resolution Wavelength Blocking Filter

Figure 9:
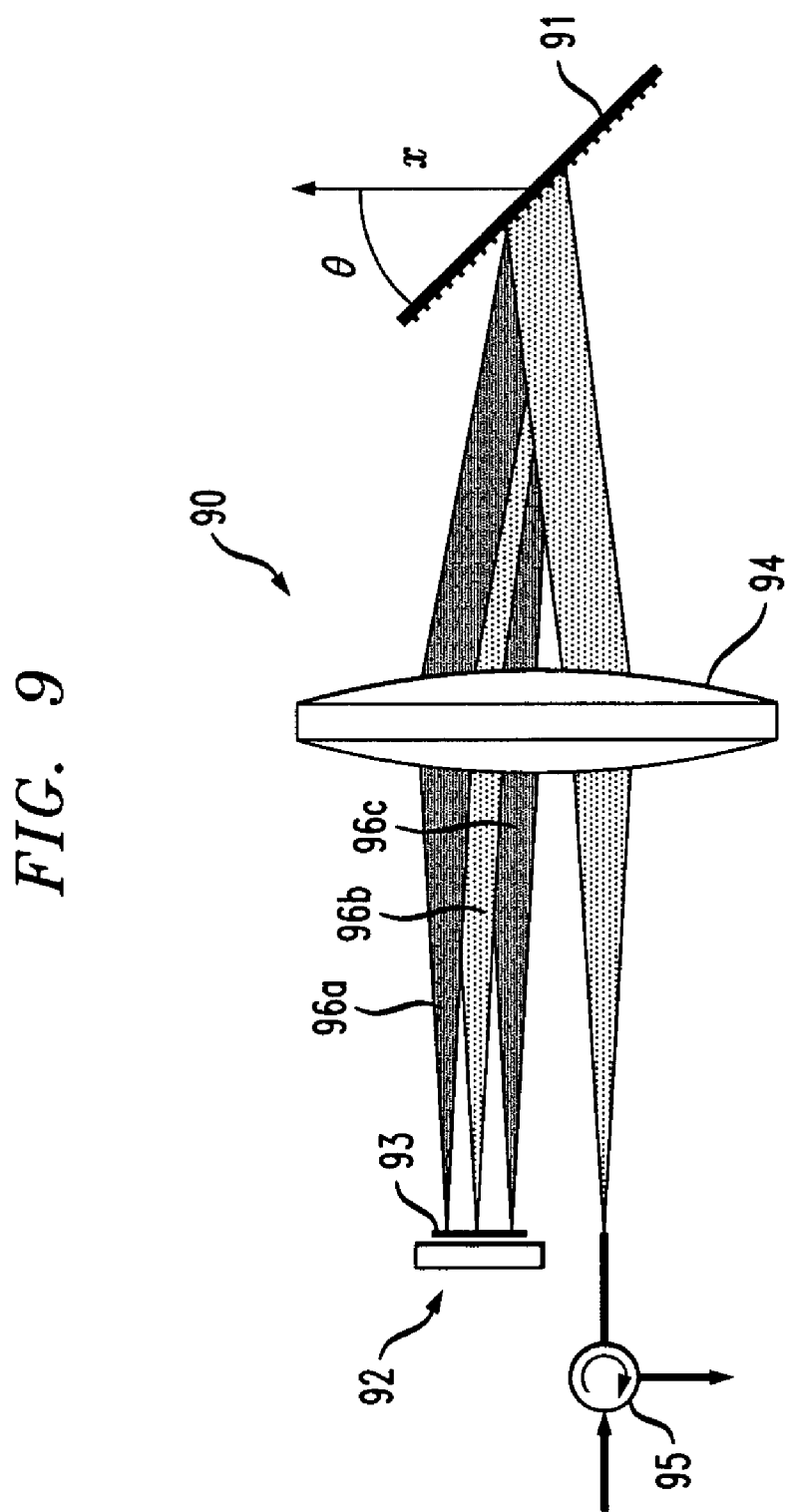
FIG. 9 shows the embodiment of the present invention used in Example 1.

The optical design of the filter 90 is shown in FIG. 9. It uses an echelle grating 91 with 52.67 lines/mm operated in the 22nd order near the Littrow configuration. The grating 91 shows a low polarization dependence (<1 dB) over the whole C-band. The MEMS device 92 is a linear array 93 of micromirrors, which have a tilt axis orthogonal to the array direction. The mirrors have a tilting range of 0–7°, and are actuated electrostatically with a maximal activation voltage of 120V. Although not shown in detail, the various channel beams 96a, 96b, and 96c are each incident upon multiple mirrors in the mirror array 93. The channel beams are focused between the grating 91 and the MEMS device 92 by virtue of a lens 94. A circulator 95 controls the signal input into the filter 90.

Figure 10:
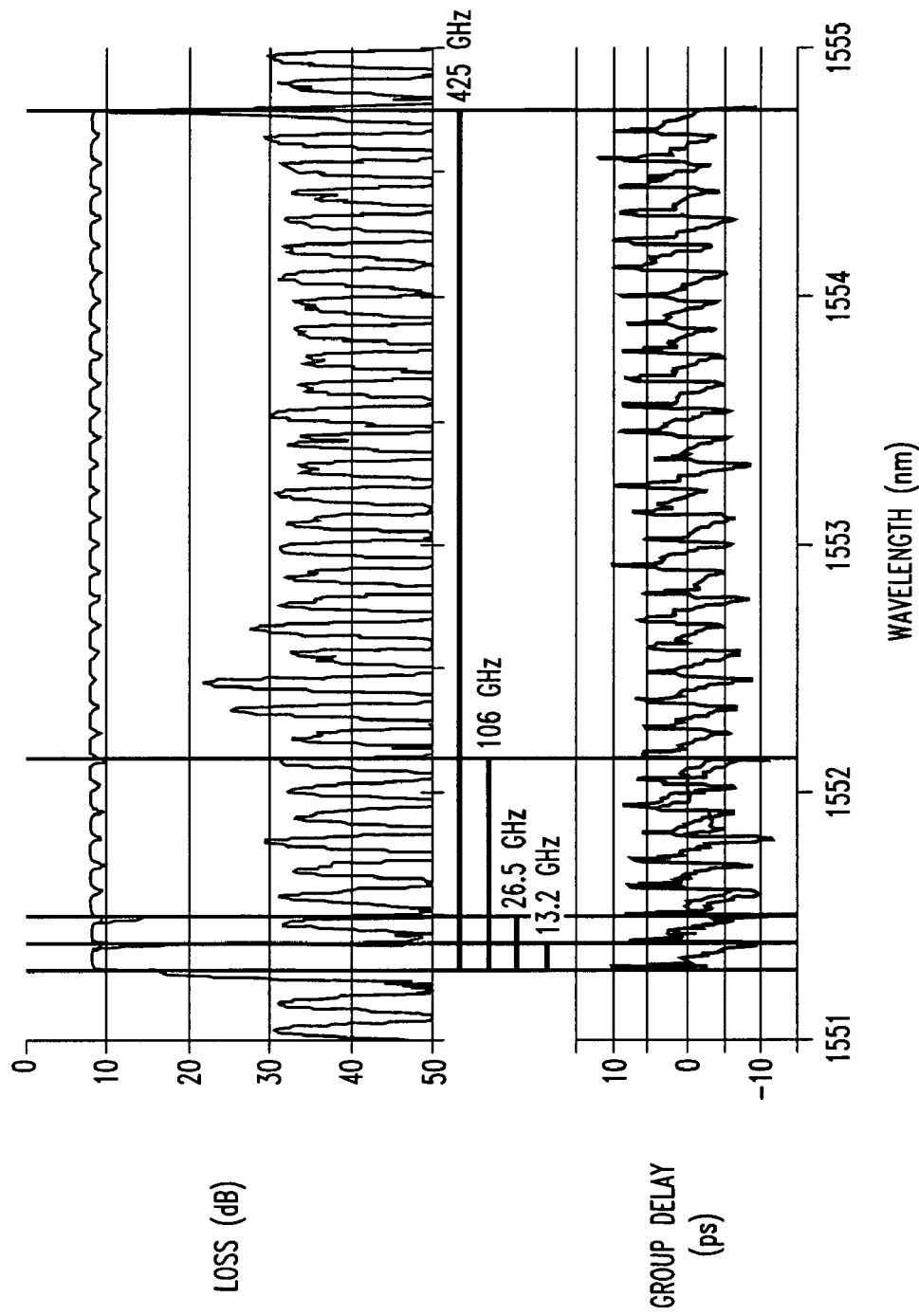
FIG. 10 shows the loss and the group delay results of Example 1.

Referring to FIG. 10, the PDL of the device resulting from the grating diffraction and the circulator is <1.1 dB and the differential group delay is less than 3 ps. The mean crosstalk averaged in the neighboring channels is typically −35 dB, but narrow spikes located at the mirror boundary with a −15 dB worst case were observed. The spikes result from the relative phase jump between the light reflected from adjacent mirrors, and can be eliminated through phase adjustments. The channels spacing of the device is determined by the grating dispersion, focal length of the lens and the micromirror size. In our device the channels spacing was 13.2 GHz, but a 12.5 GHz spacing compatible with the ITU standards can be obtained by slightly change the mirror width. However spacing equal to the data rates should be avoided, to minimize the penalty produced by the group delay ripple. The device can also by extended in total wavelength range by adding more micromirrors on the MEMS device. The lens and grating in our prototype are capable of supporting the entire C-band, requiring an array of 320 mirrors. Such an array is technically feasible, and comparable to the complexity of a linear CCD-array.

Example 2

Measurements with Multi Rate WDM Channels

In order to test the performance of the filter in a mixed channel spacing allocation, the following signals were generated: 4×2.5 Gbit/s NRZ at 13.2 GHz spacing, 4×10 Gbit/s NRZ at 28 GHz spacing, and 4×40 Gbit/s at 106 GHz channels spacing. The system 1100 for the signal generation is shown in FIG. 11, and comprises 3 sections 1101, 1102, and 1103, each one generating PRBS $2^{31}$-1 data stream. For the 4×2.5 Gbit/s and 4×10 Gbit/s signals (sections 1101 and 1102), which were spaced at 13.2 GHz and 27.5 GHz, respectively, power combiners 1104 and 1105, respectively, were used as no multiplexer at that spacing was available. The 4×40 Gbit/s signals (section 1103) were combined using a flat passband multiplexer 1106 with a nominal 100 GHz spacing. The signals from sections 1101, 1102, and 1103 were modulated using modulators 1110, 1111, and 1112, respectively.

The 10 Gbit/s signals were decorrelated using a dispersion compensating fiber 1107 with −514 ps/nm dispersion, while the 10 Gbit/s signals were decorrelated using a standard single mode fiber 1108 with 90 ps/nm for the 40 Gbit/s signals. The 2.5 Gbit/s signals were not correlated, and during the crosstalk measurements the neighboring channels were modulated by an independent pattern generator. The 2.5 and 10 Gbit/s signals and the 40 Gbit/s signals were amplified 2.5 amplified in amplifiers 1113 and 1114, respectively, before being combined and sent through the blocker 1115, which was selecting one particular channel for detection.

For the 2.5 and 10 Gbit/s signals an 8 GHz detector 1116 was used, while he 40 Gbit/s signals were detected with an optically-preamplified receiver 1117. The spectra of the generated multi-rate signals are shown in FIG. 12 after traversing the blocking filter with all mirrors set in the on-state.

In a separate experiment, the switch was tested using 160 Gbit/s CSRZ signal and a filter width of 425 GHz. The transmission penalties, out of band crosstalk penalties, and detuning ranges for the 2.5 Gb/s to 160 Gb/s signals are listed in Table 1.

TABLE 1

| Power penalty for different data rates | | | | |
|---|---|---|---|---|
| Data Rate (Gbit/s) | Channel Spacing (GHz) | Trans. Penalty (dB) | X-talk Penalty (dB) | Tuning Range (GHz) |
| 2.5 | 13.2 | 0 | 0.2 | ±5 |
| 10 | 26.5 | 0 | 0 | ±10 |
| 40 | 106 | 1.5 | 0 | ±25 |
| 160 | 425 | 0.2 | n/a | n/a |

The detuning ranges are measured at 0.5 dB penalty for 2.5 and 10 Gbit/s rates, and at 1 dB penalty for 40 Gbit/s. Thus, as the data channel moves slightly over the mirror, the signal quality will sometimes increase and otherwise decrease compared to the measurement with no device. The variation is probably related to group delay variations and the transmission dip shown in FIG. 12. Interestingly, almost no penalty was observed with the 160 Gbit/s CSRZ signal. The out of band crosstalk measurements showed only a negligible penalty from the neighboring channel. The largest effect was measured for the neighboring channel of the 2.5 Gbit/s channel, confirming that the spikes in crosstalk at −20 dB are not impairing the filter function. The center wavelength of each channel was detuned to quantify the impact of the location of the transmission and group delay ripple relative to the signal spectrum. A small dependence of ±1 dB penalty was measured for the 40 Gbit/s signal, where the sign of the penalty changed depending on the detuning direction.

Based on the above example, a new wavelength blocker with sub-data-channel spacing allocation slots has been demonstrated. The blocker can be used as the core of an OADM with variable bandwidth and channel location. We characterized the transmission of a multi-rate WDM signal through a blocking filter having 13.2 GHz spectral resolution. The device shows negligible penalty for most data rates from 2.5 to 160 Gbit/s, and a penalty <1.5 dB for 40 Gbit/s NRZ signals.

Although the present invention has been described in accordance with the embodiments shown, one of ordinary skill in the art will readily recognize that there could be variations to the embodiments and those variations would be within the spirit and scope of the present invention. For example, an important concept in the present invention is the ability to modify the propagation parameters of optical beams of different wavelengths to one of many states, such that the beams can be directed to desired locations. The embodiments disclosed in the present invention described tilting mirrors as exemplary elements that can modify the propagation parameters of an incident beam. Other beam modifying elements may be substituted, such as, shiftable rooftop prisms, spatial light modulators (based on liquid crystal, acousto-optic, electro-optic devices, etc.), other mirror combinations, switched volume holograms or photonic crystals, etc. As another example, while two or more reflective elements were previously described as controlling the beam propagation of a single wavelength or channel, it is to be understood that these elements can control the beam propagation of groups of multiple channels that are contiguous in the wavelength domain. Furthermore, the reflective elements may be configured in at least one of three ways, a first way in which at least a portion of the reflective elements receive the channel beams from the wavelength discriminating device, a second way in which at least a portion of the reflective members reflect the channel beams to the wavelength discriminating device for combining into the first beam, and a third way in which a different portion of the reflective elements reflects a portion of the channel beams to the wavelength discriminating device for combining into a second beam having fewer channels than the first beam. As shown in FIG. 1 the reflective elements are configured in the first and third way. It is possible however, that the reflective element be configured in the first way only, the second way only or the third way only. Many other modifications may be made by one of ordinary skill in the art without departing from the spirit and scope of the appended claims.

What is claimed is:

1. An optical device for discretionary treatment of channels of an optical beam, said optical device comprising:
   a port for at least transmitting or receiving a first beam having a plurality of channels;
   a wavelength discriminating device optically coupled to said port, said wavelength discriminating device adapted for at least one of receiving said first beam and diffracting said beam into a plurality of channel beams or receiving a plurality of channel beams and combining said channel beams into said first beam; and
   an array of reflective elements in a common plane, said reflective elements exceeding the number of channels, each reflective element being adapted to rotate about at least one axis, and having a first position at which said reflective element is rotated fully in one direction, a second position at which said reflective element is rotated fully in the opposite direction, and one or more intermediate positions between said first and second positions, at least a portion of said reflective elements being optically coupled to said wavelength discriminating device and reflecting said channel beams, at least two adjacent reflective elements of said portion corresponding to a particular channel beam, said at least two adjacent reflective elements being controllable to be positioned in said one or more intermediate positions to effect a desired output of said particular channel beam.

2. The optical device of claim 1, wherein said at least two adjacent reflective elements are controllable to perform at least one of coupling said particular channel beam to one or more ports, switching said particular channel beam among two or more port, attenuating all or a portion of said particular channel beam, or creating a group delay profile in said particular channel beam.

3. The optical device of claim 1, wherein said optical device has x, y, and z axes with the z axis being along the optical axis of the port, and wherein said reflective elements are controllable such that they are moveable in at least one of three directions, a first direction in which the reflective element is rotated about the y axis, a second direction in which the reflective element is rotated about an axis parallel to the x axis, and a third direction in which the reflective element is moved along the z axis.

4. The optical device of claim 3, wherein said reflective elements are configurable in just the first direction or in just the second direction.

5. The optical device of claim 3, wherein said reflective elements are configurable in all three directions.

6. The optical device of claim 3, further comprising:
   secondary ports, said port and secondary ports being aligned along the y axis with their optical axes parallel to the z axis, and wherein a certain movement of said at least two adjacent reflective elements about an axis parallel to the x-axis causes a channel beam to couple with a port along said y-axis.

7. The optical device of claim 6, wherein said certain movement of said at least two adjacent reflective elements about an axis parallel to the x-axis causes a channel beam to switch from one port to a different port along said y axis.

8. The optical device of claim 6, wherein said certain movement of said at least two adjacent reflective elements about the y-axis produces a group delay profile in said channel beam.

9. The optical device of claim 1, wherein said array is a linear array.

10. The optical device of claim 1, wherein said array is a two dimensional array.

11. The optical device of claim 1, wherein each reflective element has a width of less than 50 $\mu$m.

12. The optical device of claim 1, wherein said array of reflective elements has a linear fill density of no less than about 95%.

13. The optical device of claim 1, wherein said at least two adjacent reflective elements have a z delta which complies with the following equation:

$\lambda/2n - \lambda/8 \leq z$ delta $\leq \lambda/2n + \lambda/8$, where $\lambda$ is the wavelength of said particular channel beam and $n=0, 1, 2, \ldots, 1000$.

14. The optical device of claim 1, wherein said reflective elements are configured in at least one of three ways, a first way in which at least a portion of said reflective elements receive said channel beams from said wavelength discriminating device, a second way in which at least a portion of said reflective members reflect said channel beams to said wavelength discriminating device for combining into said first beam, and a third way in which a different portion of said reflective elements reflect a portion of said channel beams to said wavelength discriminating device for combining into a second beam having fewer channels than said first beam.

15. The optical device of claim 14, wherein said reflective elements are configured in said first and third way.

16. The optical device of claim 14, wherein said reflective elements are configured in said first way only.

17. The optical device of claim 16, wherein said wavelength discriminating device is not in the optical path between said reflective elements and said secondary ports.

18. The optical device of claim 15, wherein said wavelength discriminating device is in the optical path between said reflective elements and said secondary ports.

19. The optical device of claim 14, wherein said reflective elements are configured in said second way only.

20. The optical device of claim 14, wherein said reflective elements are configured in said third way only.

21. The optical device of claim 1, wherein said port is a fiber.

22. The optical device of claim 1, further comprising:
   secondary ports wherein each secondary port transmits or receives a secondary beam having an equal or fewer number of channels than said beam.

23. The optical device of claim 22, wherein at least one secondary beam is a single channel beam and wherein at least one secondary beam is a multichannel beam.

24. The optical device of claim 22, wherein said port is an input port and said secondary ports are output ports.

25. The optical device of claim 22, wherein said port is an output port and said secondary ports are import ports.

26. The optical device of claim 1, wherein said port is an input and an output port such that it transmits said beam and receives a secondary beam.

27. The optical device of claim 1, wherein said wavelength discriminating device comprises one or more of the following a diffraction grating, prism, and an arrayed waveguide grating (AWG).

28. A method of assembling an optical device having one or more ports, a wavelength discriminating device optically coupled to one or more ports, an array of reflective elements in a common plane, wherein the number of reflective elements significantly exceeds the number of channels handled by said optical device, each reflective element being adapted to rotate about at least one axis, and having a first position at which said reflective element is rotated fully in one direction, a second position at which said reflective element is rotated fully in the opposite direction, and one or more intermediate positions between said first and second positions, said method comprising:
 before one or more reflective elements are aligned actively to optically couple with a desired port, fixing the position of said array of reflective elements in said optical device such that a portion of the reflective elements in said common plane is in the optical path of a channel beam optically coupled to said wavelength discriminating device, and
 after said array is fixed in position relative to said optical device rotating at least two adjacent reflective elements of said portion to said one or more intermediate positions to optically couple said channel beam with a desired port.

29. The method of claim 28, wherein the reflective elements are fixed in the optical device using passive alignment.

30. A method of configuring an optical device for discretionary treatment of channels of an optical beam, said method comprising:
 providing said optical device having one or more ports, a wavelength discriminating device optically coupled to one or more ports, an array of reflective elements in a common plane optically coupled to said wavelength discriminating device, each reflective element being adapted to rotate about at least one axis, and having a first position at which said reflective element is rotated fully in one direction, a second position at which said reflective element is rotated fully in the opposite direction, and one or more intermediate positions between said first and second positions, wherein the number of reflective elements significantly exceeds the number of channels handled by said optical device, said method comprising:
 inputting said channel beams in said optical device such that said channel beams are incident on particular reflective elements, wherein at least one channel beam is incident on at least two adjacent reflective elements; and
 rotating said at least two adjacent reflective members to said one or more intermediate positions to optically couple at least a portion of said at least one channel beam to one or more ports.

31. A method of switching channels comprising:
 providing an optical device having x, y, and z axes and comprising two or more ports along the y-axis, a wavelength discriminating device coupled to one or more of said ports, and an array of reflective elements in a common plane, each reflective element being adapted to rotate about at least one axis parallel to said x axis, and having a first position at which said reflective element is rotated fully in one direction, a second position at which said reflective element is rotated fully in the opposite direction, and one or more intermediate positions between said first and second positions, at least a portion of said reflective elements being optically coupled to said wavelength discriminating device to reflect said channel beams, at least two adjacent reflective elements of said portion corresponding to a particular channel beam; and
 rotating said at least two adjacent reflective elements to said one or more intermediate positions to switch the optical coupling of said particular channel beam from one port to another port along said y-axis.

32. A method of switching channels comprising:
 providing an optical device having x, y, and z axes and comprising at least one port, a wavelength discriminating device coupled to said port, and an array of reflective elements in a common plane, each reflective element being adapted to rotate about at least one axis and having a first position at which said reflective element is rotated fully in one direction, a second position at which said reflective element is rotated fully in the opposite direction, and one or more intermediate positions between said first and second positions, at least a portion of said reflective elements being optically coupled to said wavelength discriminating device and at least two adjacent reflective elements of said portion corresponding to a particular channel beam, said method comprising; and
 rotating a first selection of said at least two adjacent reflective elements to different intermediate positions to produce a desired group delay profile for said particular channel beam.

33. The method of claim 32, wherein said optical device comprises two or more ports aligned along said y axis, and wherein said first selection of elements are rotated about said y axis, and wherein each reflective element is adapted to rotate about a second axis parallel to said x axis, and having a third position at which said reflective element is rotated fully in one direction about said second axis, a fourth position at which said reflective element is rotated fully in the opposite direction about said second axis, and one or more second intermediate positions between said third and fourth positions, and further comprising:
 rotating a second selection of said at least two adjacent reflective elements to said one or more second intermediate positions to achieve a desired transmission profile or switching function, or both, between said ports for said particular channel beam.

34. The method of claim 33, wherein said first and second selections comprise at least one common reflective, element.

35. The method of claim 31, wherein said at least two adjacent reflective elements have a z delta in which $\lambda/2n-\lambda/8 \leq z\ delta \leq \lambda/2n+\lambda/8$, where $\lambda$ is the wavelength of said particular channel beam and n=0, 1, 2, . . . 1000.

36. The method of claim 30, wherein said at least two adjacent reflective elements have a z delta in which $\lambda/2n-\lambda/8 \leq z\ delta \leq \lambda/2n+\lambda/8$, where $\lambda$ is the wavelength of said particular channel beam and n=0, 1, 2, . . . 1000.

37. The device of claim 1, wherein each reflective element is adapted to be positioned in any intermediate position between said first and second positions.

* * * * *